(No Model.) 2 Sheets—Sheet 1.

W. L. CROMWELL.
GATE.

No. 436,596. Patented Sept. 16, 1890.

WITNESSES
Jas. B. Clarke
M. M. Martin

INVENTOR
W. L. Cromwell
by E. H. Bates, Attorney

THE NORRIS PETERS CO., PHOTO-LITHO., WASHINGTON, D. C.

(No Model.) 2 Sheets—Sheet 2.
W. L. CROMWELL.
GATE.
No. 436,596. Patented Sept. 16, 1890.
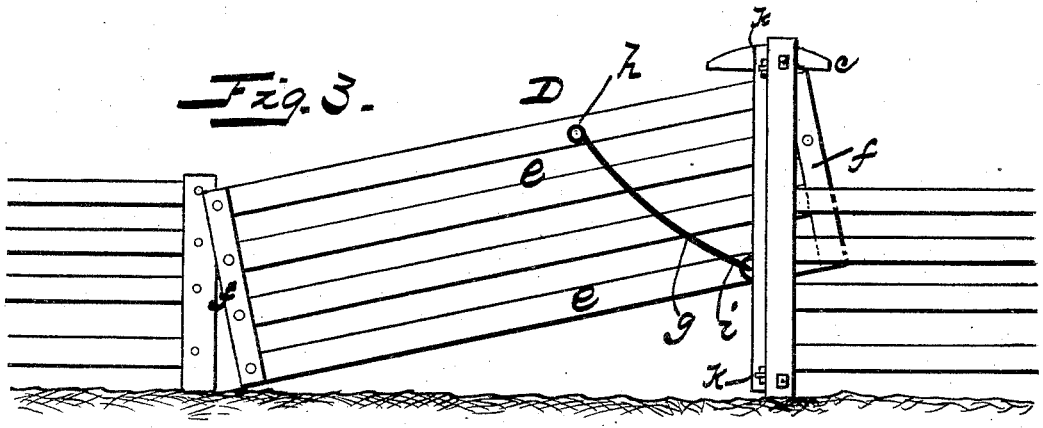
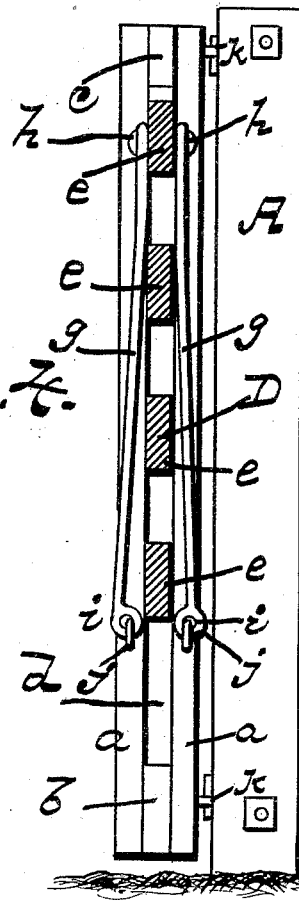
WITNESSES
Jas. B. Clarke
M. M. Martin
INVENTOR
W. L. Cromwell
by E. H. Bates, Attorney

UNITED STATES PATENT OFFICE.

WILLIAM L. CROMWELL, OF ROSCOMMON, MICHIGAN.

GATE.

SPECIFICATION forming part of Letters Patent No. 436,596, dated September 16, 1890.

Application filed July 7, 1890. Serial No. 357,971. (No model.)

*To all whom it may concern:*

Be it known that I, WILLIAM L. CROMWELL, a citizen of the United States, residing at Roscommon, in the county of Roscommon and State of Michigan, have invented certain new and useful Improvements in Gates; and I do hereby declare the following to be a full, clear, and exact description of the invention, such as will enable others skilled in the art to which it appertains to make and use the same.

This invention has relation to improvements in swinging and sliding gates; and it consists in the novel construction and arrangement of the same, all as will be hereinafter more fully explained.

The annexed drawings, to which reference is made, fully illustrate my invention, in which—

Figure 1:
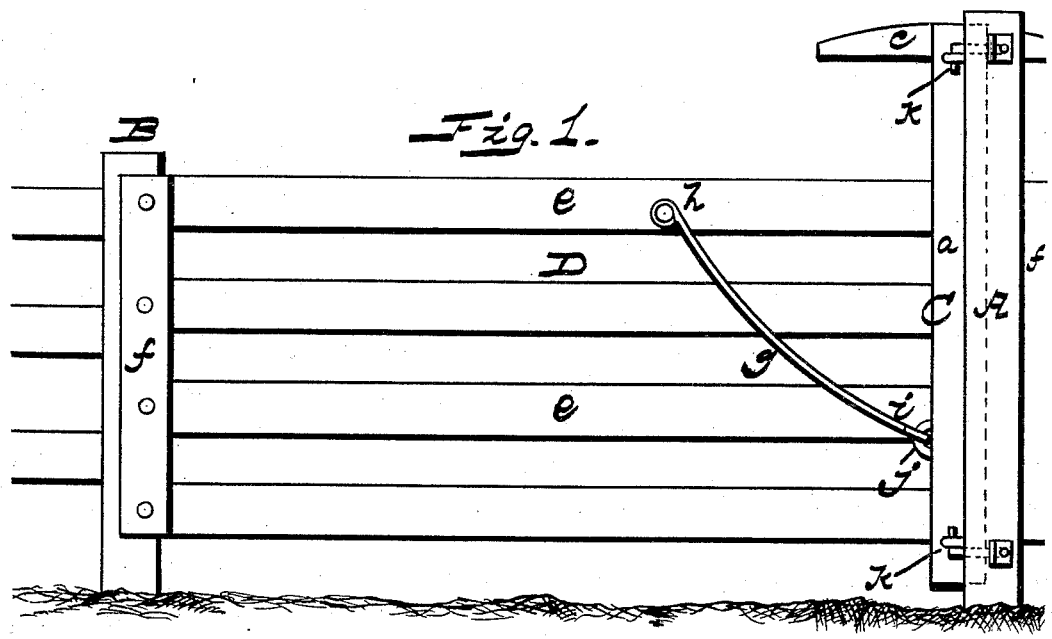
Figure 2:
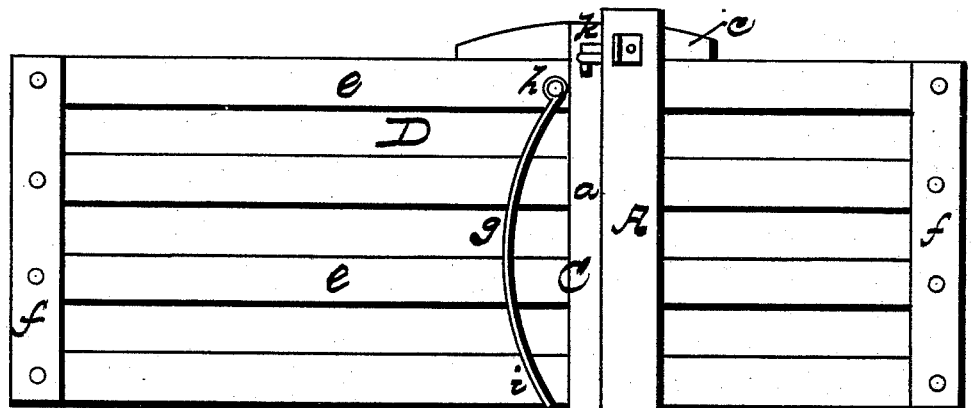

Figure 1 represents a front view of my gate closed. Fig. 2 is a similar view showing the gate half-open. Fig. 3 is a front view showing the gate in position for admitting small stock, and Fig. 4 is a cross-sectional view of the gate.

Referring by letter to the accompanying drawings, A is the gate-post, and B represents the latch-post, which two posts are set in the ground opposite to one another in the usual well-known way.

Hinged to the gate-post A is a swinging post C, composed of two vertical parallel bars $a\, a$, which are spaced from one another by a block $b$ at the lower end and a short piece or bar $c$ at the upper end. Within this space $d$, between the two uprights $a\, a$, is arranged the gate D, which latter is simple in construction, consisting of parallel horizontal bars $e$, which are connected at each end by vertical strips $f\, f$, thus completing the gate.

To opposite sides of the top rail or bar of the gate, and about the center thereof, are pivoted the upper ends of a pair of spring-rods $g$, as at $h\, h$, and their lower ends $i\, i$ are hinged or pivoted to the parallel uprights $a\, a$, as shown at $j\, j$. The bars $a\, a$ are hinged at the upper and lower ends of the gate-post, as shown at $k\, k$, and permit the gate to swing open and close.

It will be seen from the above description and by reference to the annexed drawings that the gate can be evenly balanced on the bars $a\, a$ by forcing it backward, the spring-bars at the same time raising the gate until the upper rail comes in contact with the bar $c$, when by the pressure upwardly of said spring-bars the gate is held in close contact with the bar $c$ aforesaid. Said gate can be adjusted to admit small animals and exclude large stock, and in case of deep snows the gate can be readily elevated and opened readily, and a gate constructed as herein described is durable, simple in construction, and cheap to make. At the same time there is no sagging of the gate, and the same can be opened or closed by a person on horseback as well as walking, and being so very simple it is not liable to get out of order.

Having thus described my invention, what I claim as new, and desire to secure by Letters Patent is—

The within-described gate, consisting of the gate proper, the uprights between which the gate slides, having the bars $c$ and hinged to the gate-post A, and the spring-rods arranged on either side of the gate, the upper ends thereof pivoted to the top rail of said gate and the lower ends pivoted to the uprights, all as and for the purposes set forth.

In testimony whereof I affix my signature in presence of two witnesses.

WILLIAM L. CROMWELL.

Witnesses:
A. A. GRIFFIN,
JNO. MASON.